Aug. 20, 1968  W. C. ALLSOPP, JR  3,397,646
PULSED METERING DEVICE
Filed May 31, 1966

INVENTOR
WILLIAM C. ALLSOPP, JR.
BY Beale and Jones
ATTORNEYS

United States Patent Office 3,397,646
Patented Aug. 20, 1968

3,397,646
PULSED METERING DEVICE
William C. Allsopp, Jr., 42 Beverly Place,
Little Rock, Ark. 72207
Filed May 31, 1966, Ser. No. 554,156
10 Claims. (Cl. 103—149)

ABSTRACT OF THE DISCLOSURE

A metering device for dispensing insecticide into flowing irrigation water is provided. A peristaltic pump is intermittently driven by an electric step motor which includes a ratchet and pawl mechanism. The ratchet is mounted on the pump shaft, while the pawl is energized by a solenoid driven by a pulsing circuit which includes a capacitor discharge network. A constant current source provides a linear charge for the capacitor; when the charge reaches a predetermined value, a controlled switching device is made conductive to energize the solenoid. Additional means are provided to thereafter turn off the controlled switching device and de-energize the solenoid, completing the step.

---

The present invention relates to apparatus for accurately and efficiently dispensing small, evenly spaced quantities of liquid over a long period of time. More particularly, the present invention relates to means for introducing insecticide into flowing irrigation water.

As is well known, where there is slow flowing or stagnant water, insects such as mosquitoes find their breeding grounds. This is a problem where large areas of relatively flat land are irrigated and where the water tends to flow slowly or stand in depressions. Particularly, this is a problem in rice paddies where sufficient water must be provided to cover the rice plants as they are growing. Compounding the problem is the fact that rice requires the type of climate that is usually associated with a considerable insect problem. In order to reduce or eliminate the breeding of insects such as mosquitoes, it is necessary to distribute a suitable insecticide over the affected area. In the past, this has been done in several ways, as by dusting or spraying insecticide from low-flying aircraft. These methods are unsatisfactory, in that they do not always adequately cover the infected area. Further, if great care is not taken the spray or dust can drift into other areas and endanger desirable wildlife. In addition, these are expensive ways to destroy the mosquitoes, not only because there is a considerable amount of wastage of the insecticide, but because they require the use of expensive aircraft and spraying equipment and the hiring of skilled pilots.

The present invention overcomes these problems and provides an effective means of combating mosquitoes and similar insects by adding carefully measured quantities of insecticide to the water flowing from the discharge of the pumps serving the area being irrigated. By adding the insecticide at this point, complete coverage of the flooded area is assured, without wastage and without the problem of drift to other areas. By providing a carefully measured amount of additive, the problem of injury to other forms of life can be minimized. The apparatus of the present invention is inexpensive and simple to operate, thus eliminating the need of hiring specially trained personnel. Since such irrigation areas often are located far from commercial power sources and generally are not serviced by good roads, it is a requirement of such apparatus that it be a self-contained unit, that it be light in weight, and that it be reliable in operation. Since the insecticides used are extremely powerful, requiring the depositing of only about five drops per minute into the free flowing pump discharge, it is necessary that extreme accuracy be provided.

To provide the carefully measured quantities of insecticide to the water being supplied to the irrigation area, the present invention utilizes a peristaltic pump driven by an electronic timer and a step motor to advance the roller of the pump. A capacitor discharge circuit provides the step motor with timed pulses, approximately five pulses being required to produce one drop of insecticide. The unit is battery operated so that it is independent of commercial power supplies and, by reason of the use of solid state electronic components, it is light weight, compact and extremely reliable. The unit is easily carried to remote locations, and the capacitor discharge circuit draws only a small current from the battery so that long life can be expected. Since only a small current is required, even a comparatively weak battery will give satisfactory service.

It is, therefore, an object of the present invention to provide means for introducing insecticide over a large irrigation area without endangering adjacent areas.

It is a further object of the present invention to provide apparatus for automatically dispensing small quantities of liquid over a long period of time.

An additional object of the invention is to provide apparatus for automatically injecting selected quantities of insecticide into the water discharge from the pump of an irrigation system.

Another object of the invention is the provision of a method of eliminating mosquitoes from irrigated land by introducing small amounts of insecticide into the water flowing into the irrigation system.

A further object of the present invention is the provision of a lightweight, compact and easily portable apparatus for reliably injecting a determined quantity of insecticide into an irrigation system.

An additional object of the invention is the provision of a pulsed metering device for adding small, measured quantities of insecticide to an irrigation system, the apparatus being independent of commercial power and drawing only small currents from a supply source so that it can operate unattended over a long period of time.

Another object of the invention is the provision of an insecticide metering device which accurately dispenses a selected amount of insecticide and which utilizes easily replaceable parts wherever active insecticides might damage the equipment.

Another object of the invention is the provision of an insecticide metering apparatus which utilizes solid state electronics to provide timing pulses for accurately dispensing small quantities of liquid, which apparatus is reliable and provides accurate control over the amount of liquid dispensed.

Further objects and features of the invention will best be understood and appreciated from the following detailed description of a preferred embodiment thereof, selected for purposes of illustration and shown in the accompanying drawings, in which.

Figure 1:
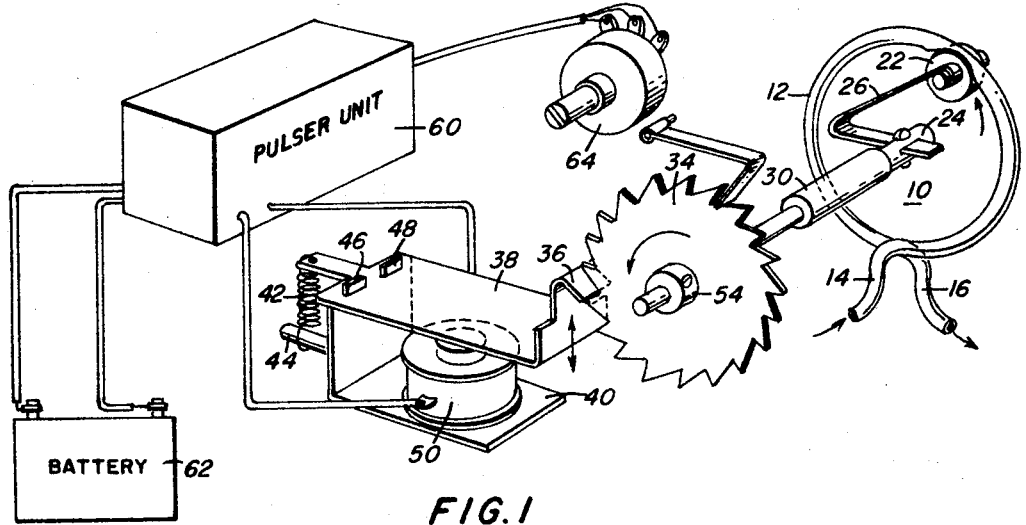
FIG. 1 is a diagrammatic showing of a unit made in accordance with the present invention.

Referring now to the diagrammatic showing of FIG. 1 there is illustrated at 10 a pump of the type suitable for use in the present invention. This pump is illustrated as being of the continuous-flow type wherein flexible-walled tubing is employed in conjunction with a rotary member which pinches or squeezes the tubing to propel a liquid therethrough at a predetermined rate. This type of pump is known in the art as a peristaltic pump and is particularly useful in providing accurately measured quantities of liquid. As shown, the pump includes a resilient, flexible tubing 12 having a small internal diameter, the tubing being formed in a loop and including an intake 14 and a discharge end 16. The tubing is preferably of rubber, although it may be of any other suitable resilient and flexible material which is resistant to the chemical action of the insecticides to be used. Normally, the tube will be mounted in a circular channel within a housing such as the channel 18 located in housing 20 of FIG. 2 to provide a surface against which the roller can act to squeeze the tube.

The rotary portion of the pump includes a roller member 22 mounted on a shaft 24 by means of a generally radially extending arm 26. Roller 22 is mounted on the end of arm 26 by means of axle 28, the roller fitting into a cut-out portion 30 of the arm for free rotation about axle 28. Shaft 24 is mounted for rotation within housing 20 by means of a bushing 30 so that roller member 32 is aligned with channel 18. Rotation of shaft 24 causes roller member 22 to roll along the outer periphery, or bottom, of channel 18.

The radially extending arm 26 is affixed to shaft 24 by any suitable means and serves to drive the roller member 22 along channel 18 as the shaft 24 rotates. Arm 26 is preferably of a flexible material such as a light gauge spring steel and serves to urge roller member 22 toward the bottom of channel 18. As has been noted above, the flexible tubing 12 is also located in channel 18 between the roller member 22 and the bottom of the channel. This arrangement causes the roller member 22 to pinch or squeeze the tubing 12 in accordance with the force exerted by the spring steel arm 26, which force is adjusted to be sufficient to close tubing 12 at the point of contact by the roller. As shaft 24 rotates, the roller 22 moves along tubing 12, advancing the point where the tube is squeezed shut and thus forcing the liquid in the tube to be driven along the tube ahead of the roller and thus to be expelled out of the discharge opening 16 at a rate determined by the speed of rotation of shaft 24. It will be apparent that as the roller moves along the tubing, a new supply of fluid will be drawn or forced into the tube through intake portion 14 from a suitable container (not shown), thus maintaining the tube full of fluid. Upon completion of one revolution of shaft 24 the initial supply of fluid will have been completely driven out of the tubing and a new supply will have been drawn into it so that the second revolution can start immediately without interrupting the flow of fluid from discharge portion 16.

Inasmuch as only very small quantities of fluid are to be dispensed by pump 10 the internal diameter of tubing 12 can be very small. This type of pump is particularly suitable to this use, since the insecticide will attack the material of the tubing, and it will have to be replaced occasionally. One of the advantages of this pump is the ease with which the tube can be replaced. Roller 22 and bushing 30, which may be of any suitable material, preferably Teflon, provide long-lasting operation, for they do not come into contact with the insecticide.

Mounted on the end of shaft 24 opposite to the connection of arm 26 is a ratchet gear 34. This gear, which is mounted in driving relationship with shaft 24, is rotated by the intermittent motion of a pawl 36. As illustrated in FIG. 1, the pawl moves vertically to rotate the ratchet gear to provide a stepped rotation of shaft 24 and thus of roller member 22. Pawl 36 is carried by a movable armature 38 which is mounted on a bracket 40. This bracket includes a pair of tabs 46 and 48 which extend through corresponding holes in armature 38 to hold the armature in place and permit a limited amount of motion. A spring 42 connected between armature 38 and a tongue 44 on the housing urges the armature, and thus pawl 36, toward its uppermost position. An electromagnet 50 is carried by bracket 40 and, when energized, serves to draw armature 38, and thus pawl 36, downward to effect rotation of ratchet gear 36. Upon deenergization of the electromagnet, of course, spring 42 returns the armature and the pawl back to their initial positions. The motion of the armature is limited to correspond with the spacing of the gear teeth on ratchet gear 34. Each step of the ratchet gear rotates the shaft 24, and thus the roller 22, through a small angle of rotation, the angle depending on the number of teeth on the ratchet. As will be noted from FIG. 1, pawl 36 and armature 38 may be formed from a single piece of material, the material being shaped and cut to provide the desired configuration. Although the armature 38 must be formed from a magnetic material, it will be apparent that pawl 36 may be of any suitable material and may be fastened to the armature in any desired manner.

In mounting the pump drive mechanism within housing 20, it will be seen that bushing 30 fits within a circular opening 50 formed in the material of the housing. A spacer washer 52 separates the ratchet gear from the bushing and the housing and holds shaft 24 in place. The ratchet gear may be held in driving relationship with the shaft 24 by means of a key or by a flat portion on the shaft corresponding to a similar flat portion in the central opening of the gear. The bushing, washer and ratchet gear may be held on shaft 24 by means of a set screw arrangement 54 or an equivalent device.

Periodic energization of the electromagnet 50 is provided by the output signals from a pulser unit 60 which provides timed output pulses of sufficient magnitude to drive ratchet wheel 34. Power supply means such as a battery 62 provides the necessary energy for pulser unit 60 while a potentiometer 64 permits adjustment of the speed of the stepped rotation of pump 10 by controlling the timing between successive output pulses from pulser unit 60.

Figure 3:
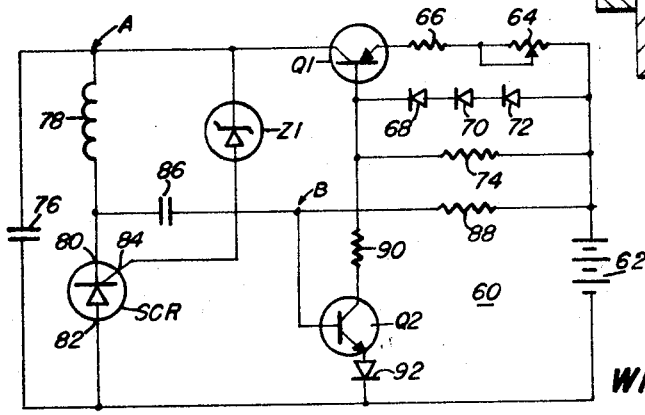
FIG. 3 is a schematic diagram of a pulsed timing circuit suitable for use in the subject invention.

Pulser unit 60 is shown in detail in FIG. 3, wherein battery 62, transistor Q1, potentiometer 64 and resistor 66, diodes 68, 70 and 72 and resistor 74 form a constant current generator to provide a linear charge for storage capacitor 76. The emitter electrode of Q1 is connected through resistor 66 and potentiometer 64 to the positive terminal of battery 62. The base electrode of Q1 is connected through the serially connected diodes 68, 70 and 72, also to the positive terminal of battery 62. A resistor 74 shunts the serially-connected diodes. Storage capacitor 76 is connected between the collector electrode of Q1 and the negative terminal of battery 62. Connected in series across the storage capacitor 76 are the impulse coil 78 of the electromagnet 50 and the anode electrode 80 and cathode electrode 82 of a silicon controlled rectifier SCR. The SCR normally is nonconductive and thus permits storage capacitor 76 to be charged through transistor Q1. Control electrode 84 of the SCR is connected through a Zener diode Z1 to the junction of the collector electrode of Q1 and storage capacitor 76. Normally nonconductive diode Z1 is sensitive to the voltage stored in capacitor 76, becoming conductive when that voltage reaches a predetermined value and thus serving to turn on the SCR. When the SCR becomes conductive, capacitor 76 discharges through coil 78, anode electrode 80 and cathode electrode 82 to ground, energizing electromagnet 50 and rotating shaft 24 one step.

If transistor Q1 were to remain conductive after the SCR is turned on, the constant current generator would supply a current flow which would hold the SCR in this condition even after depletion of the charge on the storage capacitor 76. It is therefore necessary to stop the flow of current through transistor Q1 momentarily in order to permit the SCR to become nonconductive upon completion of the discharge of capacitor 76. This is accomplished by means of a normally-conductive transistor Q2 connected between the base of transistor Q1 and the negative terminal of battery 62. The base of transistor Q2 is connected through a junction B and through a capacitor 86 to the junction of coil 78 and anode 80 and from junction B through a resistor 88 to the positive terminal of battery 62. The collector of Q2 is connected through a resistor 90 to the base of Q1 while the emitter of Q2 is connected through a diode 92 to the negative terminal of battery 62. At the start of conduction of the SCR, a pulse is applied through capacitor 86 to the base of Q2, causing Q2 to stop conducting. This causes the forward bias to be removed from the base of Q1 and thus causes Q1 to stop conducting. The length of time during which Q2 remains cut-off is determined by the value of capacitor 86 and resistor 88 and by the discharge time of storage capacitor 76.

Figure 4:
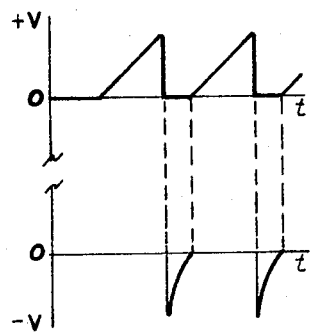
FIG. 4 illustrates the voltage wave forms at selected points in the circuit of FIG. 3.

FIG. 4 illustrates the operation of the pulser unit by showing the voltage wave forms that appear at point A (the collector of transistor Q1) and point B (the base of transistor Q2). As illustrated in FIG. 4, the conduction of transistor Q1 causes the voltage on capacitor 76 to build up gradually over a period of time which is determined by the magnitude of the current flow through Q1. This current flow is regulated by the setting of potentiometer 74. When the voltage on capacitor 76 reaches a predetermined value, Zener diode Z1 becomes conductive and causes the SCR to turn on. The voltage at point A immediately drops by reason of the low resistance path through inductor 78 and the SCR. The conduction of the SCR causes a sudden build-up of negative voltage at point B, cutting off transistor Q2. This voltage then diminishes in accordance with the value of capacitor 86 and resistor 88, which values are selected to permit Q2 to become conductive again at the proper time so that capacitor 76 can again be charged and the cycle repeated.

Figure 2:
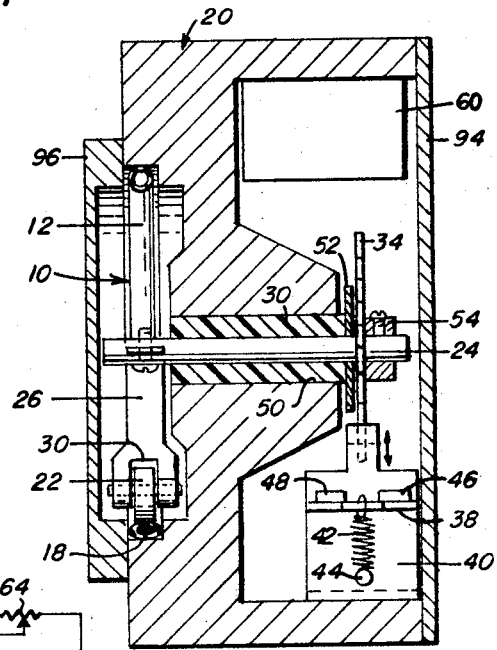
FIG. 2 is a cross sectional view of a housing assembly including a device made in accordance with the present invention.

The pulser unit 60, which includes all the electronic circuitry except battery 62, potentiometer 64 and coil 78, is completely solid state and generates very little heat during operation. Therefore it may be packaged in a very small container and, if desired, may be enclosed in a suitable potting compound. The pulser unit is placed in housing 20 as illustrated in FIG. 2. Potentiometer 64 preferably is mounted in the housing for access by removal of the back cover, but it may also be mounted so the shaft extends through the housing. The housing may also be designed to include space for the battery. The housing is closed by means of a back cover plate 94 and front cover plate 96. The housing and the cover plates are preferably of cast plastic, although any other suitable material may be used. The front cover plate is easily removable so that the tubing may easily be replaced, for the insecticide used with this device is extremely active and will attack almost any material. The front cover is provided with openings for the intake and discharge portions of the flexible tubing. It should be noted that the front cover plate forms a portion of channel 18 whereby upon removal of the front plate a portion of the channel 18 is also removed so that the flexible tube may easily be replaced.

Thus there has been provided a reliable and efficient pump mechanism for metering evenly spaced quantities of a liquid over a period of time, the device being a lightweight, easily portable, self-contained unit for use in remote areas. The unit is particularly useful in the dispensing of an insecticide to help in the control of mosquitoes, a use which requires the depositing of approximately five drops of insecticide per minute into the free flowing water from the discharge of an irrigation pump, the exact amount being dependent upon the water flow. The present unit utilizes an electronic timer which provides approximately five pulses for each drop formation, thus permitting accurate control of the delivery of the insecticide. Through the use of a capacitor pulsed discharge technique only a small amount of current is drawn from the battery and even a comparatively weak unit will give satisfactory service. However, the scope of the invention is not limited to the foregoing description, but includes the various alternatives and modifications that fall within the true spirit and scope of this invention as defined by the following claims.

I claim:

1. In a pulsed metering device for dispensing small quantities of fluid over a long period of time, pump means for transferring said fluid, electric step motor means for driving said pump, and timed electric pulser means for intermittently energizing said step motor means.

2. The device of claim 1, wherein said, fluid is an insecticide, said device dispensing said fluid into the free flowing water from the discharge of an irrigation pump, whereby said insecticide is distributed throughout the water from said irrigation pump.

3. The device of claim 1, wherein said pump means comprises a looped section of flexible, resilient tubing arranged along the periphery of a circular channel and roller means mounted on a rotatable shaft for contact with and motion along said section of flexible tubing, said roller means pressing said tubing against said circular channel with sufficient force to collapse said tubing at the point of contact of said roller means, said tubing having an intake end for receiving said fluid and a discharge end for discharging said fluid, whereby the motion of said roller means along said looped section transfers said fluid from said intake end to said discharge end.

4. The device of claim 3, wherein said step motor comprises driving means mounted on said rotatable shaft and electromagnetic means operating on said driving means in response to energization by said pulser means to rotate said shaft through a predetermined angle of rotation.

5. The device of claim 1, wherein said step motor means for driving said pump comprises a shaft, ratchet wheel means mounted in driving relationship on said shaft, a pawl for advancing said ratchet wheel, an electromagnet intermittently energized by said pulser means, an armature mounted adjacent said electromagnet for limited movement and carrying said pawl, means for urging said armature toward one limit of its motion, said electromagnet pulling said armature toward the other limit of its motion upon energization by said pulser means, whereby said shaft is rotated intermittently to drive said pump.

6. The device of claim 1, wherein said pulser means for energizing said step motor means comprises a capacitor, means for charging said capacitor at a selected rate, and first switchng means responsive to the charge level of said capacitor to open a discharge path to said step motor when the charge on said capacitor reaches a predetermined level.

7. The device of claim 6, wherein said switching means comprises a silicon controlled rectifier having anode, cathode and control electrodes, said anode and cathode electrodes being connected in series with said step motor and across said capacitor, and semiconductor means connected to said control electrode to apply a control voltage to said control electrode when the charge level of said capacitor reaches said predetermined value, causing said silicon controlled rectifier to become conductive and opening said discharge path to said step motor.

8. The device of claim 7, wherein said means for charging said capacitor comprises second, normally-conductive, switching means, said pulser means further including third switch means responsive to the start of conduction in said silicon controlled rectifier to change said second switching means to a non-conductive state, whereby said silicon controlled rectifier becomes non-conductive after the discharge of said capacitor, said third switch permitting said second switching means to return to its normally conductive condition after a predetermined period of time.

9. The device of claim 2, wherein said pump means comprises a loop of flexible, resilient tubing, roller means mounted on a rotatable shaft for collapsing the walls of said tubing progressively along its length to impel said insecticide therethrough, said step motor means comprising a ratchet wheel mounted in driving relationship on said rotatable shaft, pawl means for turning said ratchet wheel, armature means carrying said pawl means and biased toward a first position, electromagnetic means for moving said armature toward a second position in response to energizing pulses thereby to rotate said shaft through a predetermined small angle, said pulser means comprising a storage capacitor, means for charging said capacitor and means for discharging said capacitor to provide energizing pulses for said electromagnetic means, said pulser means including means for adjusting the rate of charging said capacitor and thus for adjusting the rate of repetition of said energizing pulses, whereby the rotation of said shaft is intermittent and accurate control over the dispensing of said insecticide is permitted.

10. The device of claim 9, further including a housing for said pump means, step motor means and pulser means, and a portable electrical power supply for said device, whereby said device is portable and independent of commercial electrical power supplies, said flexible tubing having a small internal diameter whereby only small quantities of insecticide are dispensed by said pump means.

References Cited

UNITED STATES PATENTS

| | | | |
|---|---|---|---|
| 2,334,148 | 11/1943 | Jones | 103—149 |
| 3,187,949 | 6/1965 | Mangel | 222—70 |
| 3,277,356 | 10/1966 | Kraft et al. | 103—149 |

FRED C. MATTERN, JR., *Primary Examiner.*

WILBUR J. GOODLIN, *Assistant Examiner.*